United States Patent [19]

Knobloch

[11] 3,916,012

[45] Oct. 28, 1975

[54] PURIFICATION OF 2,6 AND 2,7 NAPHTHALENE DICARBOXYLIC ACID

[75] Inventor: James O. Knobloch, Hobart, Ind.

[73] Assignee: Standard Oil Company, Chicago, Ill.

[22] Filed: Apr. 26, 1971

[21] Appl. No.: 137,677

Related U.S. Application Data

[63] Continuation of Ser. No. 722,557, April 19, 1968, abandoned.

[52] U.S. Cl. ............................................. 260/525
[51] Int. Cl.$^2$.................. C07C 51/42; C07C 63/38
[58] Field of Search ..................................... 260/525

[56] References Cited
UNITED STATES PATENTS

| | | | |
|---|---|---|---|
| 1,692,927 | 11/1928 | Calcott et al. ...................... | 260/525 |
| 2,744,938 | 5/1956 | Urban ................................. | 260/525 |
| 2,905,708 | 9/1959 | Peterson et al. .................... | 260/525 |
| 3,047,621 | 7/1962 | Tate.................................... | 260/525 |
| 3,361,804 | 1/1968 | Alagy................................. | 260/525 |
| 3,410,897 | 11/1968 | Shigeyasu et al. ................. | 260/525 |
| 3,699,160 | 10/1972 | Steitz ................................. | 260/525 |

*Primary Examiner*—Robert Gerstl
*Assistant Examiner*—Richard D. Kelly
*Attorney, Agent, or Firm*—Gunar J. Blumberg; Arthur G. Gilkes; William T. McClain

[57] ABSTRACT

Naphthalene dicarboxylic acids are purified by low concentration permanganate treatment at a pH upward from 10 and carbon treatment to remove at least manganous ions. The process is particularly useful for the purification of 2,6 and 2,7 naphthalene dicarboxylic acids that are to be converted to beta hydroxy alkyl esters from which corresponding film and fiber forming polyesters are made.

5 Claims, No Drawings

PURIFICATION OF 2,6 AND 2,7 NAPHTHALENE DICARBOXYLIC ACID

This application is a continuation application of application Ser. No. 722,557, filed Apr. 19, 1968 and currently abandoned.

BACKGROUND OF INVENTION

Purification of naphthalene dicarboxylic acids has become important in recent years due to the added emphasis on synthetic polyester fibers and films, whose production requires starting materials free from impurities so that the finished product is strong and eye appealing. Previous investigators have discovered purification of polycarboxylic acids through such techniques as sublimation, recrystallization, adsorption and attack of impurities through oxidation and/or reduction as well as combinations thereof. All of these techniques are limited. For example, the sublimation process is useful only when the impurities and acids do not vaporize or sublime at the same temperature. Recrystallization is useful only when impurities and acids are reasonably soluble and have different solubility characteristics. Adsorption is limited to the extraction of the impurities that are adsorbed preferentially over the product. Not all of the impurities are reducible. Oxidation with such oxidizers as permanganates and hypohalites has been proposed. Hypohalites tend to halogenate dicarboxylic acids. Permanganate oxidation is taught in U.S. Pat. No. 3,047,621, the concentration being 3 percent permanganate based on the weight of the crude acid to be purified. Permanganate treatment at this concentration is not effective in removing catalysts carried over from prior operations such as bromine in case of naphthalene dicarboxylic acids.

SUMMARY OF THE INVENTION

The invention is the process of treating an alkaline solution of ammonium or alkali metal salt of a naphthalene carboxylic acid containing trace amounts of bromide and keto groups but primarily aldehyde groups as impurities, with permanganates in a concentration of about 500 to 600 percent $MnO_4$ ion based on the weight of carboxynaphthaldehyde (aldehyde group impurities) to be treated, oxidizing the aldehyde and keto groups to acid, removing the manganese dioxide resulting from oxidation by filtration and treating the solution with carbon. Permanganate ions added in such amounts are added to about room temperature to prevent cleavage of the aromatic rings or oxidation of other carbon groups attached thereto. The temperature must be carefully controlled since treatment at temperatures greater than ambient room temperature (25° to 30°C.) result in cleavage of aromatic rings and attack on ring carbons, while treatment at temperatures below about 5°C. result in poor dissolution of the crude acid to form the acid salt and thus a reaction too slow to be economically feasible. The permanganates also have the unexpected effect of removing bromine which is present as a catalyst in the preparation of naphthalene dicarboxylic acids. This process is particularly applicable to aromatic acids which have a high level of aldehyde impurities not adsorbed by carbon and which cannot be treated with other oxidizing agents such as hypochlorite, which may chlorinate the acid. The process is particularly applicable to naphthalene dicarboxylic acids which contain impurities of monocarboxylic acids having in addition one or more aldehyde groups since these monocarboxylic acids are not completely removed by carbon even when heavily treated and the dicarboxylic acid is more readily chlorinated than other acids such as terephthalic acid. The ketone group impurities are present only in trace amounts if at all. They would be oxidized to the acid as would any alcohols present; however, removal of aldehyde impurities is the primary objective. The process has the distinct advantages of whitening the acid by removing bromine contaminants and oxidizing the aldehyde and ketone groups to acid by preferentially attacking the carbonyl groups rather than the ring structures. An end result is purified acids which are whiter and more commercially desirable since the resulting synthetic films and fibers are stronger and contain no undesirable color.

PREFERRED EMBODIMENTS

The preferred acids are 2,6 and 2,7-naphthalene dicarboxylic acids (2,6 & 2,7-NDA). The purification of 2,6 and 2,7-NDA can be carried out at low temperatures (about 5°C.) up to about room temperature. Higher temperatures result in undesirable ring cleavage with subsequent formation of "trimellitic aldehyde," or attack on ring carbons. The preferred pressure is atmospheric pressure. The preferred potassium permanganate is added either to a molar aqueous sodium salt (preferred salt) solution as prepared, or added during the preparation of the acid salt. The potassium permanganate appears to be completely reduced under these conditions but a carbon treatment after the permanganate treatment may be desirable to ensure complete manganese removal. Carbon quantitatively reduces excess permanganate and apparently adsorbs the reduced ion or manganese dioxide. Addition of carbon is not necessary; however, it may be desirable where there remain impurities after the permanganate treatment. It has also been found advantageous to control the pH during the several steps of the process. The permanganate treatment if performed at a high pH, upward from 10, is more effective, since a high pH increases the solubility of the acids allowing more complete oxidation of the undesirable aldehyde and ketone functions. The carbon treatment should be carried out at a pH of about 7, preventing any base soluble impurities from desorbing off the carbon and again contaminating the product. The ammonium or alkali metal salts if acidified to obtain free acid at high temperatures (80°C.) and low pH (about 4), facilitates free acid recovery by ensuring large particle size. The process may be illustrated by the following examples:

EXAMPLE I

A 7.0 gram sample of the crude, dry 2,6-NDA was dissolved in 27 ml of 10 percent sodium hydroxide and 50 ml distilled water in a 250 ml beaker. With strong magnetic stirring, 0.2016 grams of potassium permanganate (2.88 percent on 2,6-NDA) in 25 ml of distilled water was added all at once. The solution was stirred for 30 minutes at room temperature, then the precipitated $MnO_2$ was filtered off. The clear filtrate was added dropwise to 2.5 ml concentrated sulfuric acid in 50 cc distilled water with stirring to recover the 2,6-NDA. The 2,6-NDA was recovered on a Buchner funnel. It was suspended twice, each time in at least 50 ml of distilled water and again recovered on the Buchner funnel. After drying overnight in a 70°C. vacuum oven, the product weighed 6.8 grams. The product compared as follows with the feed:

|  | 2,6-Carboxynaphthaldehyde (CNA) | "Trimellitic Aldehydes" |
|---|---|---|
| Feed | .262% | .052% |
| Product | 0 | .13% |

EXAMPLE II

A 4.5 g. sample of crude 2,6-NDA in 17½ ml of 10 percent sodium hydroxide and 25 ml distilled water was treated as in Example I with 0.0189 g. $KMnO_4$ in 12.5 ml distilled water. After filtering off $MnO_2$, the pH of the clear filtrate was adjusted to 7–8 with Dry Ice. To this solution was added 0.9 grams activated carbon powder (Norite A) and the suspension was stirred for one hour. The carbon was filtered off and washed with distilled water. Filtrate and wash were dripped into 2.0 cc concentrated sulfuric acid in 50 cc distilled water. The precipitated 2,6-NDA was recovered and washed as in Example I. The dry 2,6-NDA weighed 4.7 grams.

|  | 2,6-CNA | "Trimellitic Aldehyde" | Br ppm |
|---|---|---|---|
| Feed | .262% | .052% | 247 |
| Product | 0 | .0248% | 62 |

EXAMPLE III

From experiments similar to those in No. 1 the permanganate required can be calculated.

| Treatment Level ($KMnO_4$) | 2,6-CNA Analyses | | | Grams 2,6-CNA Oxidized per gram $KMnO_4$ |
|---|---|---|---|---|
|  | In Feed | Remaining | Oxidized |  |
| (← wt. % of 2,6-NDA →) | | | | |
| .21 | .310 | .281 | .029 | .138 |
| 1.43 | .262 | .063 | .199 | .139 |

The reciprocal of the .139 grams 2,6-CNA oxidation per gram of $KMnO_4$, represents a $KMnO_4$ requirement of 7.2 grams per gram of 2,6-CNA or 9.1 moles per mole of 2,6-CNA or about 5.42 grams $MnO_4^-$ ion per gram of 2,6-CNA.

The data shows that there is a definite amount of $KMnO_4$ required for complete purification of naphthalene carboxylic acids. The amount of $KMnO_4$ is critical since an excess of $KMnO_4$ leads to ring cleavage with resulting formation of trimellitic acids. Experiments with an excess of $KMnO_4$ have resulted in only 50 to 60 percent recovery of the naphthalene dicarboxylic acids. The process is unique in that it does not attack the nucleus while selectively oxidizing the aldehyde and ketone groups. The effect of insufficient amounts of $KMnO_4$ results in less than quantitative oxidation of undesirable aldehyde and ketone groups to acid groups. By using the calculated amount of $KMnO_4$ recovery of the purified acid is essentially quantitative. The oxidation of the aldehyde and ketone group impurities is almost instantaneous; however, 30 minutes is allowed to ensure complete reaction.

I claim:

1. A method for purifying 2,6-naphthalene dicarboxylic acids comprising treating, at a temperature between 5°C. and ambient room temperature and at a pH upward from 10, an aqueous alkaline solution of an ammonium or alkali salt of 2,6-naphthalene dicarboxylic acids produced in the presence of bromine as a catalytic component and containing bromide, aldehyde and ketone groups, bromine, and other impurities, with from about 5.0 to about 6.0 grams of permanganate ion ($MnO_4^-$) per gram of carboxynaphthaldehyde impurity to be removed, removing the manganese dioxide by-product resulting from the permanganate, lowering the pH of the treated aqueous alkaline solution to about 7, contacting said treated aqueous alkaline solution with carbon, and recovering the purified acid by acidifying the solution with an acid having an ionization constant greater than that of the acid to be purified.

2. The process of claim 1 wherein the recovery of the purified acid is carried out at a pH of about 4.

3. The process of claim 1 wherein the alkaline moiety of the aqueous alkaline solution to which the crude acid is added is selected from the group consisting of sodium hydroxide and potassium hydroxide.

4. The process of claim 1 wherein the permanganate ions are supplied by addition of permanganate compounds selected from the group consisting of $NaMnO_4$, $LiMnO_4$, $KMnO_4$ and $CsMnO_4$.

5. The process of claim 1 wherein the permanganate ions are supplied by addition of $KMnO_4$.

* * * * *